US012620658B2

(12) United States Patent
An et al.

(10) Patent No.: US 12,620,658 B2
(45) Date of Patent: May 5, 2026

(54) POUCH BATTERY CELL AND BATTERY MODULE INCLUDING THE SAME

(71) Applicant: LG Energy Solution, Ltd., Seoul (KR)

(72) Inventors: In Gu An, Daejeon (KR); Ki Woong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 800 days.

(21) Appl. No.: 17/908,382

(22) PCT Filed: Sep. 9, 2021

(86) PCT No.: PCT/KR2021/012307
§ 371 (c)(1),
(2) Date: Aug. 31, 2022

(87) PCT Pub. No.: WO2022/065764
PCT Pub. Date: Mar. 31, 2022

(65) Prior Publication Data
US 2023/0335839 A1     Oct. 19, 2023

(30) Foreign Application Priority Data

Sep. 28, 2020   (KR) ........................ 10-2020-0126271
Sep. 2, 2021    (KR) ........................ 10-2021-0116871

(51) Int. Cl.
*H01M 50/186*        (2021.01)
*H01M 50/105*        (2021.01)
(Continued)

(52) U.S. Cl.
CPC ....... *H01M 50/186* (2021.01); *H01M 50/105* (2021.01); *H01M 50/119* (2021.01); *H01M 50/121* (2021.01); *H01M 50/124* (2021.01)

(58) Field of Classification Search
CPC .................................................... H01M 50/186
See application file for complete search history.

(56) References Cited

U.S. PATENT DOCUMENTS

| | | |
|---|---|---|
| 2010/0143787 A1 | 6/2010 | Jung et al. |
| 2012/0040235 A1 | 2/2012 | Cho et al. |

(Continued)

FOREIGN PATENT DOCUMENTS

| | | |
|---|---|---|
| CN | 111712939 A | 9/2020 |
| JP | 2001325925 A | 11/2001 |

(Continued)

OTHER PUBLICATIONS

International Search Report for Application No. PCT/KR2021/012307 mailed Jan. 3, 2022, 2 pages.

(Continued)

*Primary Examiner* — Nicole M. Buie-Hatcher
*Assistant Examiner* — Krishna R Hammond
(74) *Attorney, Agent, or Firm* — Lerner David LLP

(57) ABSTRACT

A pouch battery cell according to one embodiment of the present disclosure includes an electrode assembly including a cathode, an anode and a separator interposed between the cathode and the anode; and a battery case to which the electrode assembly is attached, wherein the battery case comprises an upper case, a lower case, and a receiving portion formed between the upper case and the lower case, wherein the battery case is formed with sealing portions in which outer peripheral surfaces of the upper case and the lower case are heat-sealed to each other, and wherein one end of at least a part of the sealing portions is recessed in the inside of the battery case.

14 Claims, 7 Drawing Sheets

(51) Int. Cl.
    *H01M 50/119*     (2021.01)
    *H01M 50/121*     (2021.01)
    *H01M 50/124*     (2021.01)

(56)           References Cited

U.S. PATENT DOCUMENTS

| | | |
|---|---|---|
| 2014/0134467 A1 | 5/2014 | Lee et al. |
| 2014/0377633 A1 | 12/2014 | Kong |
| 2018/0062225 A1 | 3/2018 | You et al. |
| 2019/0051868 A1 | 2/2019 | Lee et al. |
| 2019/0305260 A1 | 10/2019 | Kim et al. |
| 2020/0083493 A1 | 3/2020 | Lee |
| 2020/0111999 A1* | 4/2020 | Kim |
| 2020/0343575 A1 | 10/2020 | Kim et al. |
| 2022/0085449 A1* | 3/2022 | Fukuda |
| 2023/0059867 A1 | 2/2023 | Takahashi et al. |

FOREIGN PATENT DOCUMENTS

| | | | |
|---|---|---|---|
| JP | 2010192154 A | | 9/2010 |
| JP | 2013-131427 A | | 7/2013 |
| JP | 6248586 | B2 | 12/2017 |
| JP | 2018-523905 A | | 8/2018 |
| JP | 2019-160813 A | | 9/2019 |
| JP | 2020-514989 A | | 5/2020 |
| KR | 20080041113 A | | 5/2008 |
| KR | 20120013883 A | | 2/2012 |
| KR | 101218370 B1 | | 1/2013 |
| KR | 20140147991 A | | 12/2014 |
| KR | 20170055144 A | | 5/2017 |
| KR | 20180055427 A | | 5/2018 |
| KR | 20180082890 A | | 7/2018 |
| KR | 20190069875 A | | 6/2019 |
| WO | 2019-039409 A1 | | 2/2019 |
| WO | 2019-150939 A1 | | 8/2019 |
| WO | 2020148986 A1 | | 7/2020 |

OTHER PUBLICATIONS

Extended European Search Report including Written Opinion for Application No. 21872793.1 dated Jul. 3, 2024. 8 pgs.

* cited by examiner

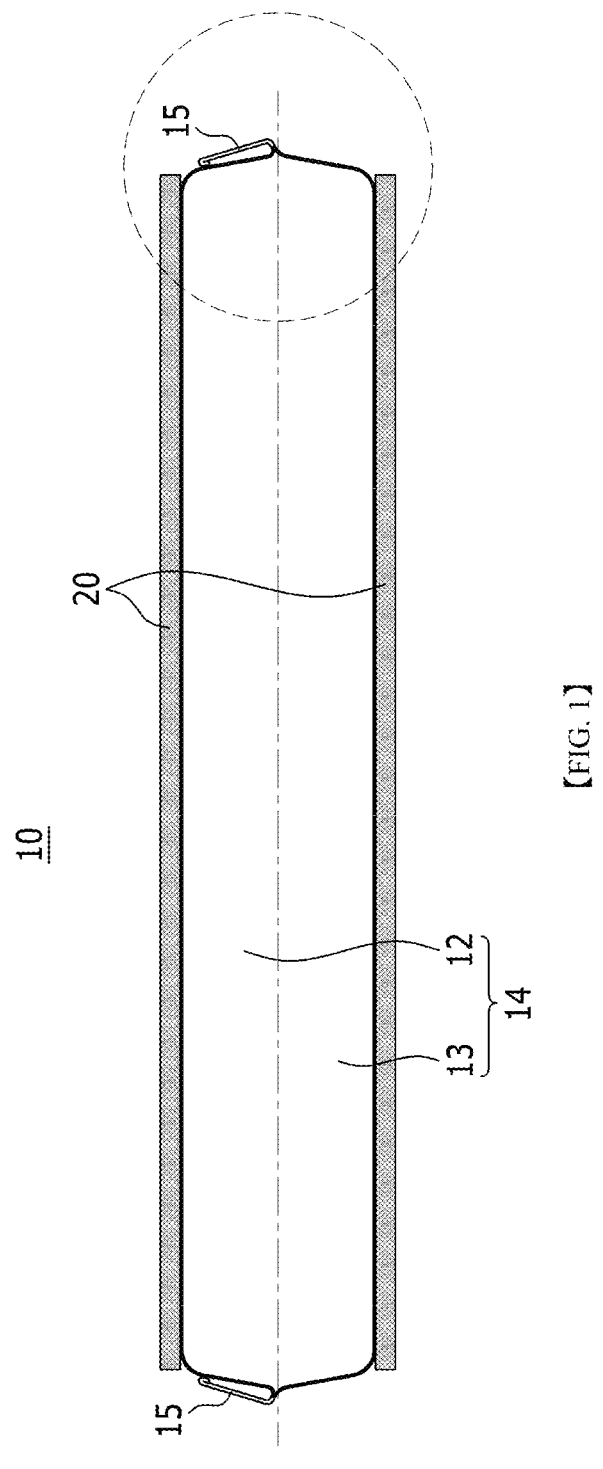
[FIG. 1]

【FIG. 2】
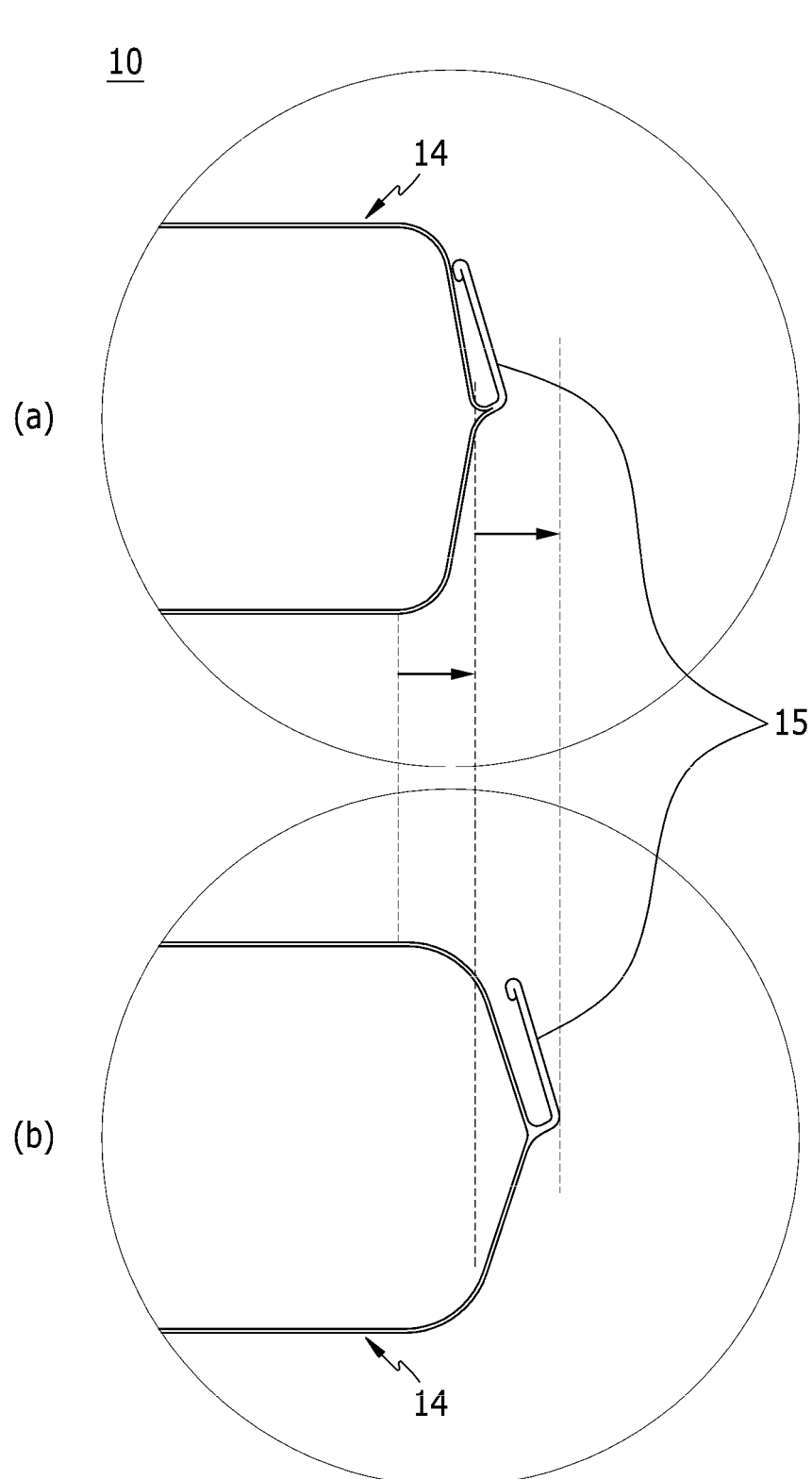

【FIG. 3】
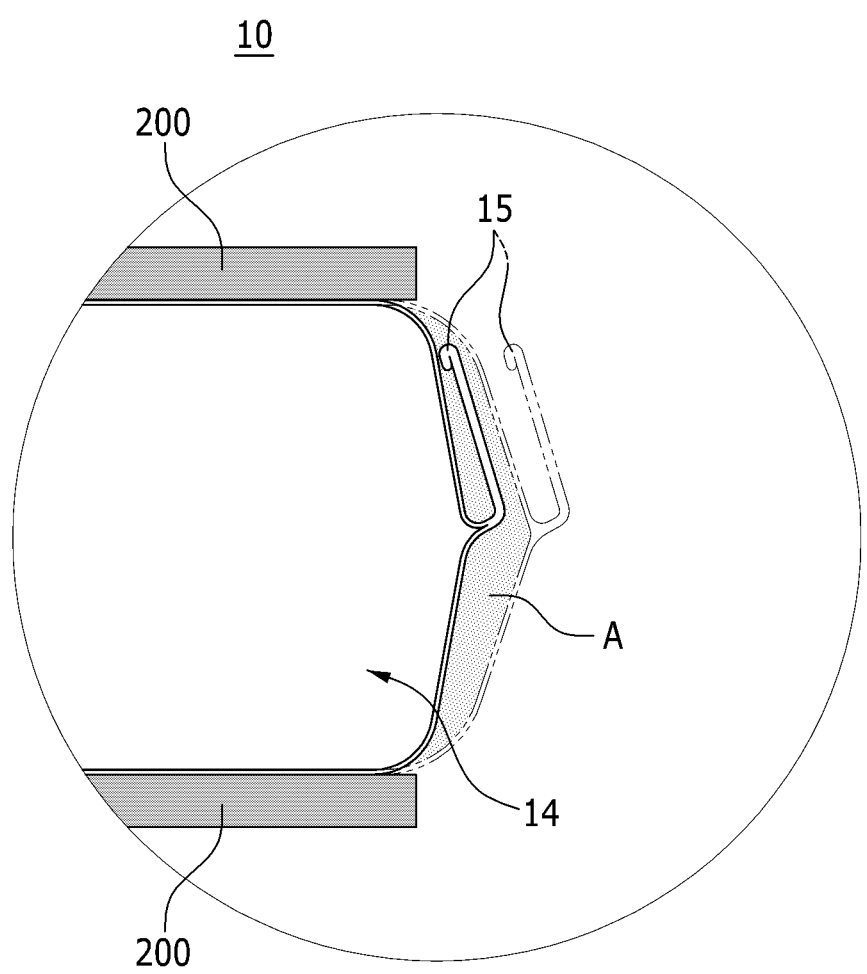

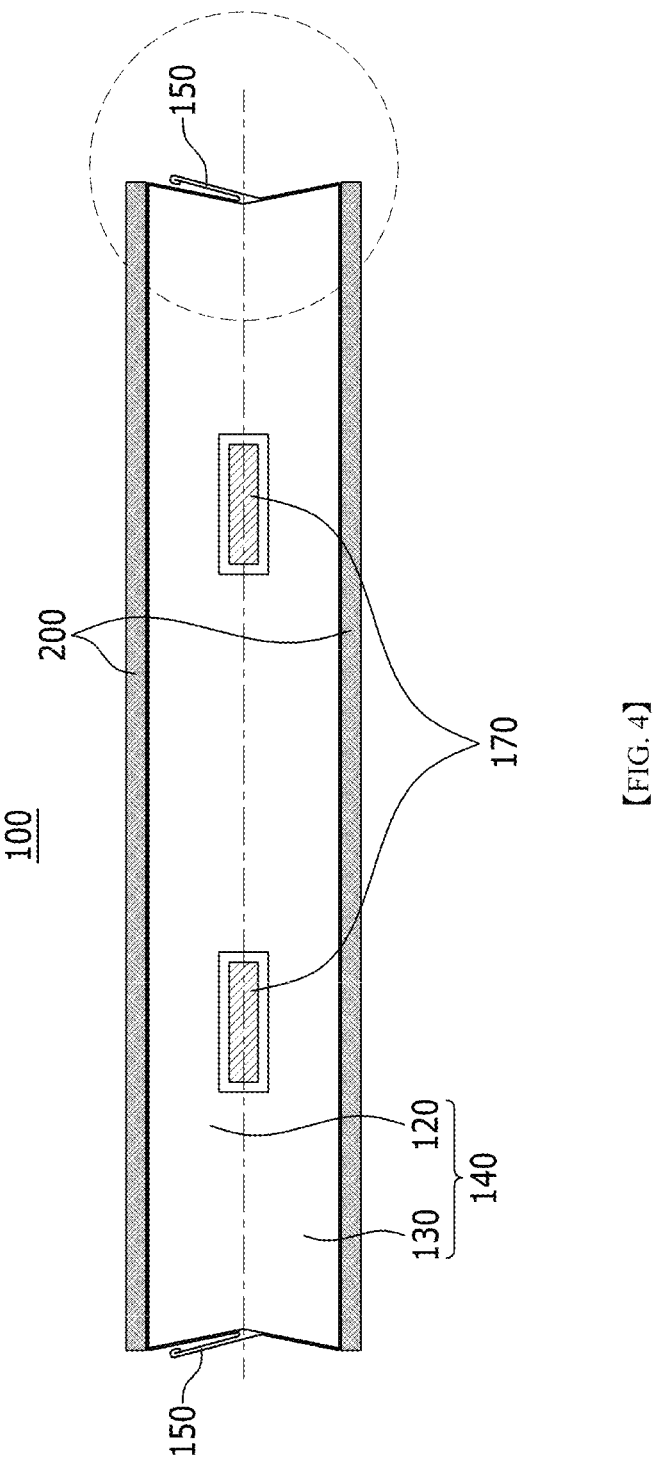
[FIG. 4]

【FIG. 5】
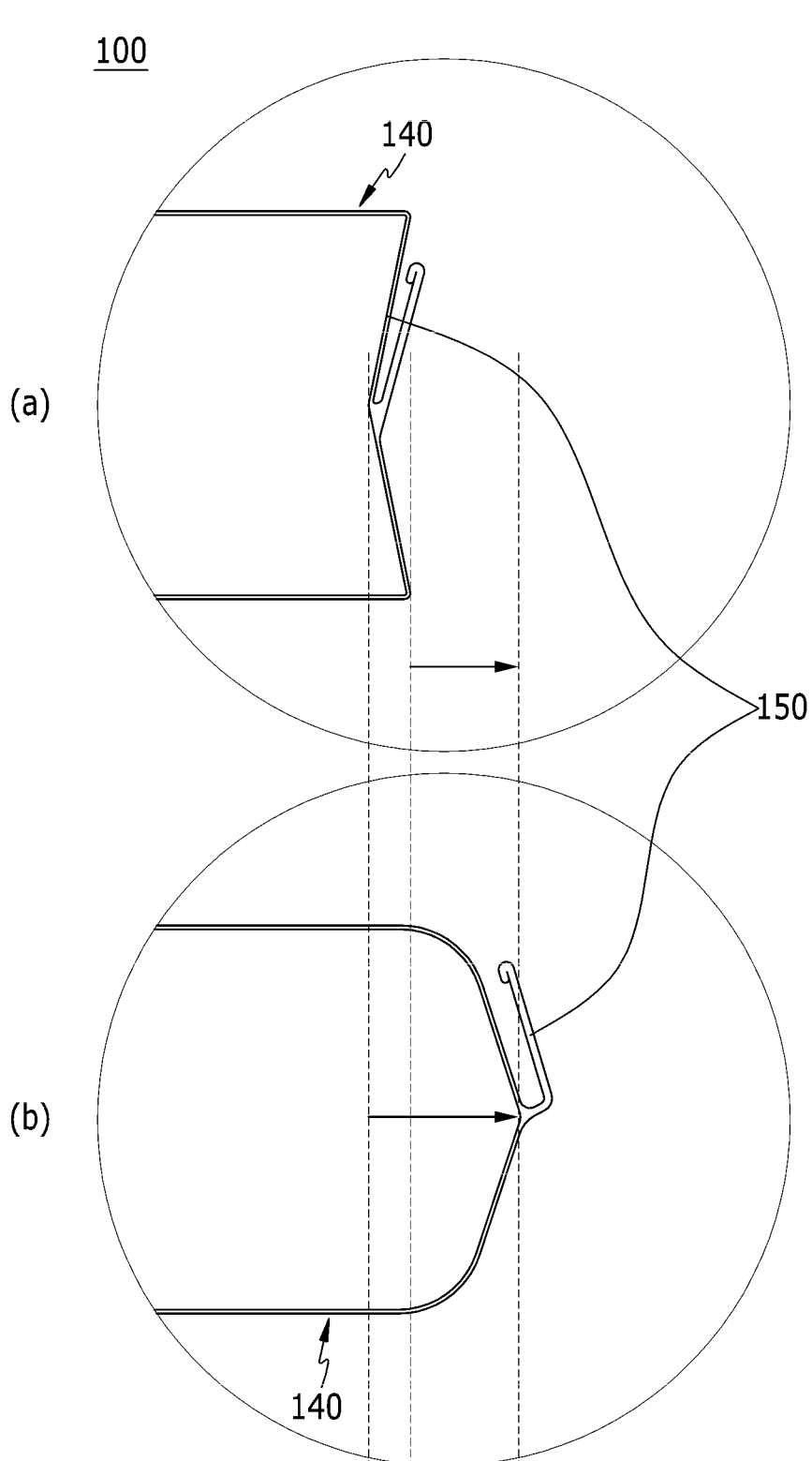

【FIG. 6】
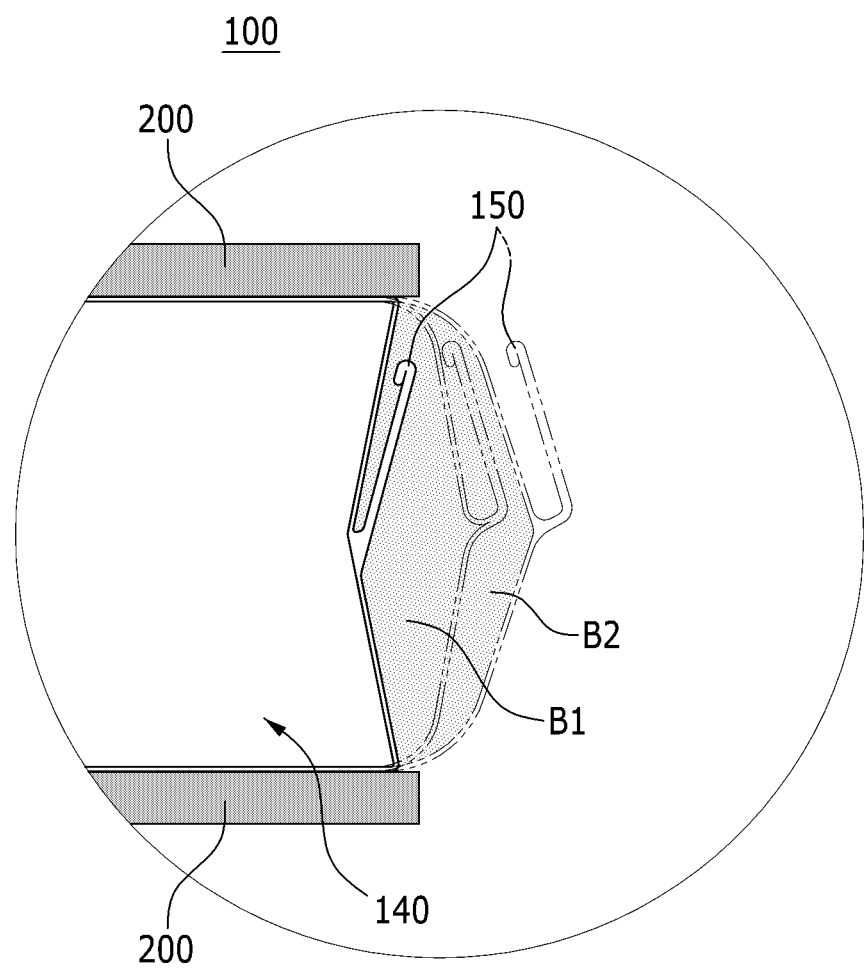

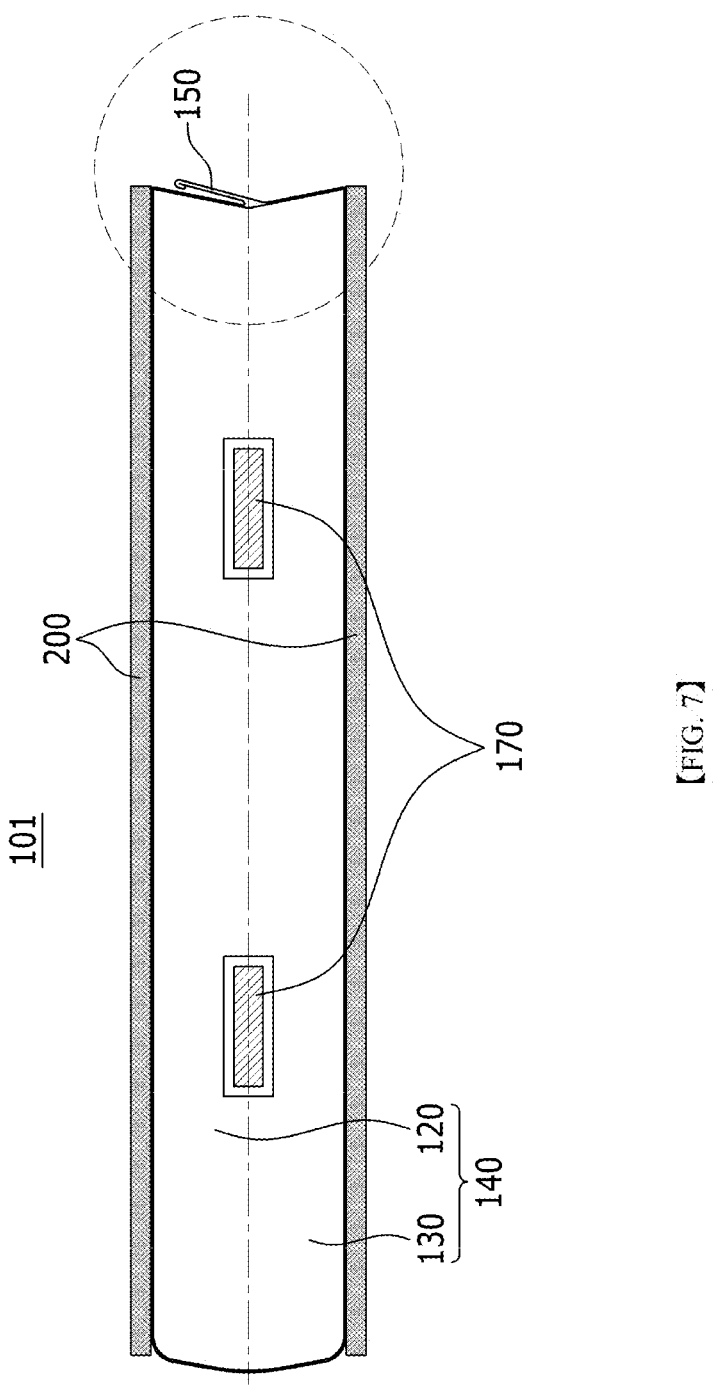
[FIG. 7]

POUCH BATTERY CELL AND BATTERY MODULE INCLUDING THE SAME

CROSS-REFERENCE TO RELATED APPLICATIONS

This application is a national stage entry under 35 U.S.C. § 371 of International Application No. PCT/KR2021/012307, filed on Sep. 9, 2021, which claims priority to Korean Patent Application No. 10-2020-0126271, filed on Sep. 28, 2020, and Korean Patent Application No. 10-2021-0116871, filed on Sep. 2, 2021, the disclosures of which are hereby incorporated herein by reference in their entireties.

TECHNICAL FIELD

The present disclosure relates to a pouch battery cell and a battery module including the same, and more particularly to a pouch battery cell that is improved in dimensional stability, delays a venting phenomenon caused by gas generated inside the battery cell, and prevents electrical corrosion of the sealing portion, and a battery module including the same.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of a battery case, such a secondary battery is classified into a cylindrical battery where an electrode assembly is built in a cylindrical metal can, a prismatic battery where an electrode assembly is built in a prismatic metal can, and a pouch type battery where an electrode assembly is built in a pouch type case formed of an aluminum laminate sheet. Here, the electrode assembly built in the battery case is a power generating element, having a structure including a cathode, an anode, and a separator interposed between the cathode and the anode, and is capable of being charged and discharged. The electrode assembly may be classified as a jelly-roll type electrode assembly configured to have a structure in which a long sheet-type cathode and a long sheet-type anode, which are coated with active materials, are wound with a separator being interposed between the cathode and the anode, and a stacked type electrode assembly configured to have a structure in which a plurality of cathodes and anodes are sequentially stacked with separators being interposed between the cathodes and the anodes.

Among them, particularly, a pouch type battery, having a structure in which a stacked type or a stacked/folded type electrode assembly is built in a pouch type battery case formed of an aluminum laminate sheet, has advantages such as low manufacturing costs, small weight, and easy shape deformation, and therefore, is gradually increasing in the amount of its usage.

FIG. 1 is a front view showing a conventional pouch battery cell.

Referring to FIG. 1, the pouch battery cell 10 includes a battery case 14 including an upper case 12 and a lower case 13, wherein an electrode assembly (not shown) is built in the upper case 12 and the lower case 13. Further, the upper case 12 and the lower case 13 include a sealing portion 15 formed by heat-sealing the outer peripheral surfaces of the upper case 12 and the lower case 13 in order to seal the electrolyte solution contained with the electrode assembly.

FIG. 2 is an enlarged view showing a side portion of the pouch battery cell of FIG. 1. FIG. 2(a) is a view before expansion of the battery cell, and FIG. 2(b) is a view after expansion of the battery cell. FIG. 3 is a diagram showing an expansion region A in which the side portion of the pouch battery cell of FIG. 1 is expanded.

Referring to FIG. 1, the pouch battery cell 10 is used by being press-bonded to the metal plate 20 located at both sides of the pouch battery cell 10 when assembling a battery module or battery pack. Referring to FIGS. 2 and 3, the pouch battery cell 10 generates a large amount of gas in the inside of the battery cell during the charging and discharging process, whereby high pressure is induced inside the sealed case, which causes a swelling phenomenon. The metal plate 20 interrupts the expansion of the pouch battery cell 10 to the upper and lower portions, so that one side portion of the pouch battery cell 10 can be expanded like the expansion region A.

However, referring to FIG. 3, in the case of the conventional pouch battery cell 10, when a swelling phenomenon occurs in one side portion of the pouch battery cell 10, the one side portion of the pouch battery cell 10 deviates from the dimensions of the metal plate 20 located at both sides of the pouch battery cell 10. Thereby, there is a high possibility that the sealing portion 15 of the pouch battery cell 10 is damaged, which causes a problem that the internal gas is vented to the outside, and external gas or moisture is flowed into the battery cell, thereby degrading battery performance.

In addition to this, referring to FIG. 3, the sealing portion 15 is exposed to the outside, and thus, when the pouch battery cell 10 is attached to a battery module (not shown), it may come into contact with other components. Thereby, when a negative potential is generated during the charging and discharging process, electrical corrosion occurs in the metal portion exposed to the sealing portion 15, which causes problems such as the loss of moisture blocking function and the battery function. Thus, generally, in the prior art, the metal portion exposed from the sealing portion 15 was folded or rolled and thus positioned inside, or a separate tape was attached to the metal portion. However, in the case of folding or rolling the metal portion exposed from the sealing portion 15 and thus positioning inside, the sealing portion 15 itself is still exposed on the outer surface of the battery cell 10, which makes it difficult to completely block the electrical corrosion generated on the metal portion of the sealing portion 15. Further, when a separate tape is attached to the metal portion, there is a problem that a separate additional process must be performed.

Therefore, there is a need to develop a pouch battery cell 10 that can delay the venting phenomenon and prevent electrical corrosion of the sealing portion, while ensuring dimensional stability against external deformation due to gas generated inside the pouch battery cell 10.

DETAILED DESCRIPTION OF THE INVENTION

Technical Problem

It is an object of the present disclosure to provide a pouch battery cell that is improved in dimensional stability, delays a venting phenomenon caused by gas generated inside the battery cell, and prevents electrical corrosion of the sealing portion, and a battery module including the same.

The objects of the present disclosure are not limited to the aforementioned objects, and other objects which are not described herein should be clearly understood by those skilled in the art from the following detailed description.

Technical Solution

According to one aspect of the present disclosure, there is provided a pouch battery cell comprising: an electrode assembly including a cathode, an anode and a separator interposed between the cathode and the anode; and a battery case to which the electrode assembly is attached, wherein the battery case comprises an upper case, a lower case, and a receiving portion formed between the upper case and the lower case, wherein the battery case is formed with sealing portions in which outer peripheral surfaces of the upper case and the lower case are heat-sealed to each other, and wherein one end of at least a part of the sealing portions is recessed in the inside of the battery case.

The other end of at least a part of the sealing portions may be bent in a direction adjacent to a side surface of the upper case or the lower case.

The other end of at least a part of the sealing portions may be located on the inside with respect to the side surface of the battery case.

Among the sealing portions, one end of the sealing portion formed on the outer peripheral surface located at both sides of the outer peripheral surface on which the electrode lead is formed is recessed in the inside of the battery case.

Among the sealing portions, one end of a pair of sealing portions facing each other on both side surfaces of the battery case may be recessed in the inside of the battery case.

The other end of a pair of sealing portions may be bent in a direction adjacent to a side surface of the upper case or the lower case.

The other end of a pair of sealing portions may be located on the inside with respect to the side surface of the battery case.

The pair of sealing portions may be respectively formed on the outer peripheral surface located at both sides of the outer peripheral surface on which the at least one electrode lead is formed.

The receiving portion may include a first receiving portion formed in the upper case and a second receiving portion formed in the lower case, and the first receiving portion and the second receiving portion may be respectively recessed to a length corresponding to the height of the electrode assembly.

The battery case may be composed of a pouch type case of a laminated sheet including a resin layer and a metal layer.

The upper case and the lower case may have a shape symmetrical to each other.

According to another aspect of the present disclosure, there is provided a battery module comprising the above-mentioned pouch battery cell.

The battery module may further include a metal plate located on at least one side surface of the pouch battery cell.

Advantageous Effects

According to embodiments of the present disclosure, a part of the sealing portions of the pouch battery cell have a structure that is recessed in the inside of the battery cell, it is possible to improve dimensional stability, delay a venting phenomenon caused by gas generated inside the battery cell, and prevent electrical corrosion of the sealing portion.

The effects of the present disclosure are not limited to the effects mentioned above and additional other effects not described above will be clearly understood from the detailed description and the appended drawings by those skilled in the art.

BRIEF DESCRIPTION OF THE DRAWINGS

FIG. 1 is a front view showing a conventional pouch battery cell;

FIG. 2 is an enlarged view showing a side portion of the pouch battery cell of FIG. 1;

FIG. 3 is a diagram showing an expansion region A in which the side portion of the pouch battery cell of FIG. 1 is expanded.

FIG. 4 is a front view of a pouch battery cell according to an embodiment of the present disclosure;

FIG. 5 is an enlarged view showing the side portion of the pouch battery cell of FIG. 4;

FIG. 6 is a diagram showing a region in which the side portion of the pouch battery cell of FIG. 4 is expanded; and FIG. 7 is a front view of a pouch battery cell according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Now, the pouch battery cell 100 according to an embodiment of the present disclosure will be described. However, the description is made based on the front surface of the front and rear surfaces of the pouch battery cell 100, without being not necessarily limited thereto, and the rear surface will be described with identical or similar contents.

FIG. 4 is a front view of a pouch battery cell according to an embodiment of the present disclosure.

Referring to FIG. 4, a pouch battery cell 100 according to an embodiment of the present disclosure includes an electrode assembly (not shown) including a cathode, an anode and a separator interposed between the cathode and the anode, and a battery case 140 to which the electrode assembly is attached.

The battery case 140 includes an upper case 120, a lower case 130, and a receiving portion formed between the upper case 120 and the lower case 130. Further, the receiving portion includes a first receiving portion formed in the upper case 120 and a second receiving portion formed in the lower case 130. Further, the receiving portion may have a structure in which the first receiving portion of the upper case 120 and the second receiving portion of the lower case 130 are respectively recessed from the surfaces of the upper case 120 and the lower case 130, and the sum of the recessed lengths representing the extent to which they are recessed may correspond to the height of the electrode assembly. In one example, the upper case 120 and the lower case 130 may have a shape symmetrical to each other with respect to a center line of the battery case 140.

Referring to FIG. 4, the battery case 140 is formed with sealing portions 150 to which outer peripheral surfaces of the upper case 120 and the lower case 130 are heat-sealed to each other. Here, the upper case 120 and the lower case 130 may be composed of a pouch type case of a laminated sheet including a resin layer and a metal layer, respectively. Further, the sealing portion 150 may be formed by mutually sealing the resin layer of the upper case 120 and the resin layer of the lower case 130 by heat and pressure.

Referring to FIG. 4, one end of at least a part of the sealing portions 150 according to the present embodiment may be recessed in the inside of the battery case 140. That is, in order to form a sealing portion 150 in which one end of the upper case 120 and one end of the lower case 130 meet and seal to each other, a sealing extension portion of the upper case 120 and a sealing extension portion of the lower case 130 may have a shape concavely recessed in the inside of the battery cell 100 as shown in FIG. 4.

Further, in a modified embodiment, the pouch battery cell 100 may be used by being press-bonded by the metal plates 200 located at both sides of the pouch battery cell 100 when assembling a battery module or battery pack. At this time, the expansion of the pouch battery cell 10 to the upper and lower portions is interrupted due to the metal plate 200, and a swelling phenomenon occurs at the side portion of the pouch battery cell 100. Here, the pouch battery cell 100 according to the present embodiment has a structure in which one end of at least a part of the sealing portions 150 is recessed in the inside of the battery case 140 and thus, it is possible to ensure dimensional stability against external deformation of the side portion of the pouch battery cell 100 due to the swelling phenomenon.

More specifically, one end of a pair of sealing portions 150 facing each other on both sides of the battery case 140 among the sealing parts 150 may be recessed in the inside of the battery case 140. That is, on both side surfaces of the battery case 140 that face each other, each side surface of the first receiving portion of the upper case 120 and the second receiving portion of the lower case 130 may be inclined each other toward the inside of the battery case 140. In one example, the sealing portion 150 may be formed on the outer peripheral surface located on one side surface or both side surfaces of the outer peripheral surface on which the at least one electrode lead 170 is formed. In other words, the sealing portion 150 may be formed on the outer peripheral surface where the electrode lead 170 is not formed.

Therefore, the pouch battery cell 100 according to the present embodiment has a structure where one end of the sealing portion 150 is recessed in the inside of the battery case 140, which can induce a swelling phenomenon as to occur at each side where the sealing portion 150 is located. Further, when the sealing portion 150 is formed on the outer peripheral surface located on one side or both sides of the outer peripheral surface on which the at least one electrode lead 170 is formed, the electrical connection between the electrode tab (not shown) of the pouch battery cell 100 and the electrode lead 170 may not be interrupted due to the swelling phenomenon, thus exhibiting high cell stability. In addition to this, the dimensional stability of the side portion of the pouch battery cell 100 can also be ensured.

FIG. 5 is an enlarged view showing the side portion of the pouch battery cell of FIG. 4. FIG. 5(*a*) is a view before expansion of the battery cell, and FIG. 5(*b*) is a view after expansion of the battery cell. FIG. 6 is a diagram showing a region in which the side portion of the pouch battery cell of FIG. 4 is expanded.

Referring to FIGS. 5 and 6, when one end of the sealing portion 150 is recessed in the inside of the battery case 140, the pouch battery cell 100 according to the present embodiment can collect gas corresponding to a region corresponding to the primary expansion region B1 and the secondary expansion region B2, considering the side portion of the battery cell before and after expansion. More specifically, when the primary swelling phenomenon occurs at the side portion of the pouch battery cell 100 according to the present embodiment, primarily, the side portion may be expanded by the area of the primary expansion region B1. Further, when the secondary swelling phenomenon occurs at the side portion of the pouch battery cell 100, secondarily, the side portion may be further expanded by the area of the secondary expansion region B2.

Comparing FIGS. 3 and 6, the pouch battery cell 100 according to the present embodiment is configured such that the total area of the primary expansion region B1 and the secondary expansion region B2 is relatively significantly increased relative to the expansion region A of the conventional battery cell 10, thus capable of collecting a larger amount of gas than the conventional battery cell 10.

Further, in the battery cell 10 of FIG. 3, the expansion region A immediately deviates from the metal plate 20 when the swelling phenomenon occurs. Unlike the same, referring to FIG. 6, in the pouch battery cell 100 according to the present embodiment, even if the primary swelling phenomenon occurs, the primary expansion region B1 is located within the dimensions of the metal plate 200, so that the dimensional stability of the pouch battery cell 100 can be further improved. The pouch battery cell 100 according to the present embodiment can collect more gas generated inside the battery cell, which is advantageous in that dimensional stability is increased and venting due to internal gas can also be delayed. Further, it may be easy to manufacture a battery module or battery pack using the pouch battery cell 100.

Further, even among the sealing portions 150, when the sealing portion 150 formed on the outer peripheral surface where the electrode lead 170 is not located is recessed in the inside of the battery case 140, the pouch battery cell 100 according to the present embodiment can expand an outer peripheral surface on which the electrode lead 170 is not located. Therefore, the pouch battery cell 100 according to the present embodiment has an advantage in that the stability is increased and the venting phenomenon due to the internal gas can also be delayed, without interfering with the electrical connection between the electrode tab (not shown) and the electrode lead 170 of the pouch battery cell 100.

In addition, even if the pouch battery cell 100 according to the present embodiment is attached to the frame of the battery module or battery pack, the pouch battery cell 100 expands an outer peripheral surface where the electrode lead is not located, whereby it can be easy to manufacture a battery module or battery pack using the pouch battery cell 100, without interfering with the electrical connection between the electrode lead of the pouch battery cell 100 and the battery module or battery pack.

Further, referring to FIG. 4, when one end of the sealing portion 150 is recessed in the inside of the battery case 140, the other end of the sealing portion 150 may be bent in a direction adjacent to one side surface of the upper case 120 or the lower case 140. That is, the other end of the sealing portion 150 may be bent adjacent to the side surface of the upper case 120 or the lower case 140.

More specifically, when one end of a pair of sealing portions 150 facing each other on both sides of the battery case 140 is recessed in the inside of the battery case 140, the other end of the pair of sealing portions 150 may be bent in a direction adjacent to the side surface of the upper case 120 or the lower case 130. That is, the other end of the pair of sealing portions 150 may be bent adjacent to both side surfaces of the upper case 120 or the lower case 140, respectively.

Thereby, the other end of the sealing portion 150 may be located inside the battery case 140 with respect to the side surface of the battery case 140 and thus, it is possible to prevent the sealing portion 150 from being exposed to the outside without a separate additional process. Further, as the sealing portion 150 is prevented from being exposed to the outside, it is possible to prevent the sealing portion 150 from coming into contact with other components when the pouch battery cell 100 is attached within a battery module (not shown). Thereby, it is possible to prevent electrical corrosion caused by contact between the sealing portion 150 and other components. Further, the sealing portion 150 may also improve the insulation performance of the pouch battery cell 100. In addition, the pouch battery cell 100 according to the present embodiment can be more easily attached to the frame of the battery module or battery pack.

FIG. 7 is a front view of a pouch battery cell according to another embodiment of the present disclosure.

Referring to FIG. 7, the battery cell 101 according to another embodiment of the present disclosure includes an electrode assembly (not shown) including a cathode, an anode and a separator interposed between the cathode and the anode, and a battery case 140 to which the electrode assembly is attached, similarly to the battery cell 100 of FIG. 4. In the present embodiment, most of the description of each component may be described similarly to the battery cell 100 of FIG. 4, and the part different from the battery cell 100 of FIG. 4 will be mainly described.

The battery cell 101 of the present embodiment has a structure in which one of the outer peripheral surfaces located at both sides of the battery case 140 with respect to the outer peripheral surface on which the electrode leads 170 are formed may be formed with a sealing portion 150, and the other one may not be formed with the sealing portion 150. In one example, referring to the left side portion of the battery cell 101 of FIG. 7, the surface on which the sealing portion 150 is not formed is not subjected to a separate sealing, and may be a surface where the upper case 120 and the lower case 130 of the battery case 140 are integrated with each other.

In the present embodiment, in the portion where the sealing part 150 is formed among the outer peripheral surfaces located at both sides of the battery case 140 with respect to the outer peripheral surface on which the electrode leads 170 are formed, one end of the sealing portion 150 may be recessed in the inside of the battery case 140. Further, in the battery case 140, the portion on which the sealing part 150 is not formed among the outer peripheral surfaces located on both sides with respect to the outer peripheral surface on which the electrode leads 170 are formed may not be recessed as in FIG. 7, or may be recessed unlike FIG. 7.

Therefore, in the pouch battery cell 101 according to the present embodiment, in the outer peripheral surface located on both sides with respect to the outer peripheral surface on which the electrode lead 170 is formed in the battery case 140, one end of the sealing portion 150 formed on one outer peripheral surface is recessed in the inside of the battery case 140, and a swelling phenomenon may be induced to occur at each side where the sealing portion 150 is located. In addition, the sealing portion 150 is not formed on the outer peripheral surface of the other one, and thus, the sealing force of the battery cell 101 can be further improved.

A battery module according to another embodiment of the present disclosure includes the pouch battery cell described above. Meanwhile, one or more battery modules according to the present embodiment may also be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

DESCRIPTION OF REFERENCE NUMERALS

100, 101: pouch battery cell
120: upper case
130: lower case
140: battery case
150: sealing portion
200: metal plate

The invention claimed is:

1. A pouch battery cell comprising:
an electrode assembly including a cathode, an anode and a separator interposed between the cathode and the anode; and
a battery case in which the electrode assembly is disposed,
wherein the battery case comprises an upper case, a lower case, and a receiving portion formed between the upper case and the lower case,
wherein the battery case is formed with sealing portions at which outer peripheral surfaces of the upper case and the lower case are heat-sealed to each other
wherein a first end of at least a part of the sealing portions is recessed towards an inside of the battery case, and
wherein a sealing extension portion of the upper case and a sealing extension portion of the lower case have a shape concavely recessed in the inside of the pouch battery cell.

2. The pouch battery cell according to claim 1, wherein:
a second end of the at least a part of the sealing portions
   is bent and is disposed adjacent to a side surface of the
   upper case or the lower case.

3. The pouch battery cell according to claim 2, wherein:
the second end of the at least a part of the sealing portions
   is located closer to the electrode assembly than a part
   of a side surface of the battery case.

4. The pouch battery cell according to claim 1, wherein:
among the sealing portions, the first end of the sealing
   portion formed on the outer peripheral surface located
   at first and second opposite sides of the outer peripheral
   surface on which an electrode lead of the electrode
   assembly is formed is recessed towards the inside of the
   battery case.

5. The pouch battery cell according to claim 1, wherein:
among the sealing portions, the first end of a pair of the
   sealing portions facing each other on first and second
   opposite side surfaces of the battery case is recessed
   towards the inside of the battery case.

6. The pouch battery cell according to claim 5, wherein:
a second end of a pair of the sealing portions is bent and
   is disposed adjacent to a side surface of the upper case
   or the lower case.

7. The pouch battery cell according to claim 6, wherein:
the second end of the pair of the sealing portions is located
   closer to the electrode assembly than a part of a side
   surface of the battery case.

8. The pouch battery cell according to claim 5, wherein:
the pair of the sealing portions are respectively formed on
   the outer peripheral surface located at first and second
   opposite sides of the outer peripheral surface on which
   at least one electrode lead of the electrode assembly is
   formed.

9. The pouch battery cell according to claim 1, wherein:
the receiving portion comprises a first receiving portion
   formed in the upper case and a second receiving portion
   formed in the lower case, and
the first receiving portion and the second receiving por-
   tion are together recessed to a combined length corre-
   sponding to the height of the electrode assembly.

10. The pouch battery cell according to claim 1, wherein:
the battery case is composed of a pouch type case of a
   laminated sheet including a resin layer and a metal
   layer.

11. The pouch battery cell according to claim 1, wherein:
the upper case and the lower case have respective shapes
   that are symmetrical to each other.

12. A battery module comprising the pouch battery cell
according to claim 1.

13. The battery module according to claim 12,
further comprising a metal plate located on at least one
   side surface of the pouch battery cell.

14. The pouch battery cell according to claim 2, wherein:
a second end of the at least a part of the sealing portions
   is located inside the battery case with respect to the side
   surface of the battery case.

* * * * *